United States Patent
Li (10) Patent No.: US 12,158,995 B1
(45) Date of Patent: Dec. 3, 2024

(54) POSTURE RECOGNITION METHOD AND ELECTRONIC DEVICE

(71) Applicant: BEIJING XIAOMI ROBOT TECHNOLOGY CO., LTD., Beijing (CN)

(72) Inventor: Yong Li, Beijing (CN)

(73) Assignee: BEIJING XIAOMI ROBOT TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/238,927

(22) Filed: Aug. 28, 2023

(30) Foreign Application Priority Data

May 19, 2023 (CN) .......................... 202310575271.9

(51) Int. Cl.
  *H04B 1/38* (2015.01)
  *G06F 3/0346* (2013.01)
(52) U.S. Cl.
  CPC .................................. *G06F 3/0346* (2013.01)
(58) Field of Classification Search
  CPC ................................................... H04W 36/32
  See application file for complete search history.

(56) References Cited

U.S. PATENT DOCUMENTS

| | | | |
|---|---|---|---|
| 2006/0135150 A1* | 6/2006 | Oh | H04W 36/32 455/425 |
| 2007/0259699 A1* | 11/2007 | Homchaudhuri | H04W 52/0216 455/574 |
| 2023/0118945 A1* | 4/2023 | Gao | G06T 7/50 |

OTHER PUBLICATIONS

Extended European Search Report issued Mar. 12, 2024 in European Patent Application No. 23196358.8, 9 pages.
Jin et al., "Fast and Accurate Initialization for Monocular Vision/INS/GNSS Integrated System on Land Vehicle", IEEE Sensors Journal, vol. 21, No. 22, Nov. 15, 2021, pp. 26074-26085.

* cited by examiner

*Primary Examiner* — Nan-Ying Yang
(74) *Attorney, Agent, or Firm* — Oblon, McClelland, Maier & Neustadt, L.L.P.

(57) ABSTRACT

A posture recognition method is applied to a mobile terminal, the mobile terminal includes a visual inertial unit and an accompanying unit different from the visual inertial unit, and the accompanying unit is started earlier than the visual inertial unit. The method includes: acquiring by the accompanying unit initialization parameters used by the visual inertial unit for initialization when the mobile terminal is in a stable state; and acquiring by the visual inertial unit the initialization parameters from the accompanying unit when an initialization condition is met, and initializing the visual inertial unit based on the acquired initialization parameters, to output posture data of the mobile terminal based on an initialization result.

12 Claims, 3 Drawing Sheets

POSTURE RECOGNITION METHOD AND ELECTRONIC DEVICE

CROSS-REFERENCE TO RELATED APPLICATION

This application is based on and claims priority to Chinese Patent Application No. 202310575271.9 filed on May 19, 2023, the entire contents of which are incorporated herein by reference for all purposes.

BACKGROUND

Technical Field

When a mobile terminal is in a motion state, it is necessary to recognize its postures at all times. For example, for a robot, it is necessary to recognize its postures at all times, for positioning or navigation according to the recognized postures.

SUMMARY

The present disclosure relates to a field of terminals, and in particular to a posture recognition method and an electronic device.

According to a first aspect of the present disclosure, a posture recognition method is provided, the method is applied to a mobile terminal, the mobile terminal includes a visual inertial unit and an accompanying unit different from the visual inertial unit, the accompanying unit is initiated earlier than the visual inertial unit, and the method includes: acquiring by the accompanying unit initialization parameters used by the visual inertial unit for initialization when the mobile terminal is in a stable state, and acquiring by the visual inertial unit the initialization parameters from the accompanying unit when an initialization condition is met, and initializing the visual inertial unit based on the acquired initialization parameters, to output posture data of the mobile terminal based on an initialization result.

According to a second aspect of the present disclosure, there is provided an electronic device, and the electronic device includes a processor and a memory for storing instructions executable by the processor. The processor is configured to instruct an accompanying unit to acquire initialization parameters used by a visual inertia unit for initialization when a mobile terminal is in a stable state, and instruct the visual inertial unit to acquire the initialization parameters from the accompanying unit when a initialization condition is met, and to be initialized based on the acquired initialization parameters, to output posture data of the mobile terminal based on an initialization result.

BRIEF DESCRIPTION OF THE DRAWINGS

The accompanying drawings, which are incorporated in and constitute a part of this specification, illustrate embodiments consistent with the present disclosure and together with the description, serve to explain the principles of the present disclosure.

DETAILED DESCRIPTION OF THE PREFERRED EMBODIMENTS

Reference will now be made in detail to illustrative embodiments, examples of which are illustrated in the accompanying drawings. When the following description refers to the drawings, unless otherwise indicated, the same numbers in different drawings indicate the same or similar elements. The illustrative embodiments described in the following description do not represent all embodiments consistent with the present disclosure. Rather, they are merely examples of devices and methods consistent with some aspects of the present disclosure as detailed in the appended claims.

The terms used in the present disclosure are for the purpose of describing specific embodiments only and are not intended to limit the present disclosure. The singular forms "a", "said" and "the" used in the present disclosure and the appended claims are also intended to include the plural forms, unless the context clearly indicates other meaning. It should also be understood that the term "and/or" as used herein refers to and includes any or all possible combinations of one or more associated listed items.

It should be understood that although the terms "first", "second", "third", etc. may be used to describe various information in the present disclosure, these information should not be limited to these terms. These terms are only used to distinguish the same type of information from each other. For example, without departing from the scope of the present disclosure, the first information may also be called the second information, and similarly, the second information may also be called the first information. Depending on the context, the word "if" as used herein may be interpreted as "when" or "while" or "in response to determining".

A visual inertial unit, also known as a visual inertial odometer or a visual inertial navigation odometer, may be used to identify the posture of a mobile terminal and determine a travel mileage of the mobile terminal based on the posture information obtained continuously.

In the process of posture recognition, the visual inertial unit combines the sensor data of many sensors, such as a visual sensor and a motion sensor, so that the posture recognition has a high accuracy. Therefore, most mobile terminals at present recognize their postures through the visual inertial unit.

However, although the visual inertial unit has a high accuracy in the process of posture recognition, the posture recognition operation of the visual inertial unit is carried out based on the initialization result, so that the accuracy of the obtained posture recognition result is also affected by the initialization result. It should be understood that if the initialization result is not accurate, it cannot be guaranteed that the posture information recognized and obtained subsequently based on the initialization result is accurate.

In the related art, the visual inertial unit usually acquires initialization parameters for initialization by itself when it is started, so as to initialize itself based on the obtained initialization parameters. However, when the visual inertial unit is started, the mobile terminal may be in an unstable state, for example, the mobile terminal may just be in complex motions such as a high-speed motion and a repetitive motion with frequent direction changes. It should be understood that in this unstable state, the parameters obtained by the sensor are usually inaccurate, so that the initialization parameters obtained by the visual inertial unit are also inaccurate. Accordingly, the initialization result obtained by the visual inertial unit based on the acquired initialization parameters is also inaccurate.

It can be seen that the initialization result of the visual inertial unit is inaccurate in the related art, which leads to the inaccurate posture recognition operation of the visual inertial unit.

As can be seen from the above introduction, the problem of the inaccurate initialization result in the related art is caused by the fact that the visual inertial unit needs to acquire the initialization parameters by itself when it is started, and the mobile terminal may be in the unstable state when the visual inertial unit is started.

In view of this, the present disclosure additionally deploys an accompanying unit in the mobile terminal, which is different from the visual inertial unit and used for acquiring the above initialization parameters. The accompanying unit is started earlier than the visual inertial unit. On this basis, the accompanying unit may acquire the initialization parameters used by the visual inertial unit for initialization when the mobile terminal is in a stable state, without the need for the visual inertial unit to temporarily acquire the initialization parameters by itself when the initialization condition such as being started is met.

It should be understood that the accompanying unit dedicated to acquiring the initialization parameters is disposed in the present disclosure, so that the present disclosure can acquire the accurate initialization parameters at any time when it is detected that the mobile terminal is in the stable state, and the problem in the related art that the acquired initialization parameters are not accurate due to the limitation of the acquisition time of the initialization parameters, for example, when the visual inertial unit is started, is avoided. It can be seen that by providing the accompanying unit in the present disclosure, the problem in the related art that the initialization result is inaccurate due to the need for the visual inertial unit to acquire the initialization parameters by itself can be effectively avoided.

Next, each step of a posture recognition method proposed in the present disclosure will be introduced.

Figure 1:
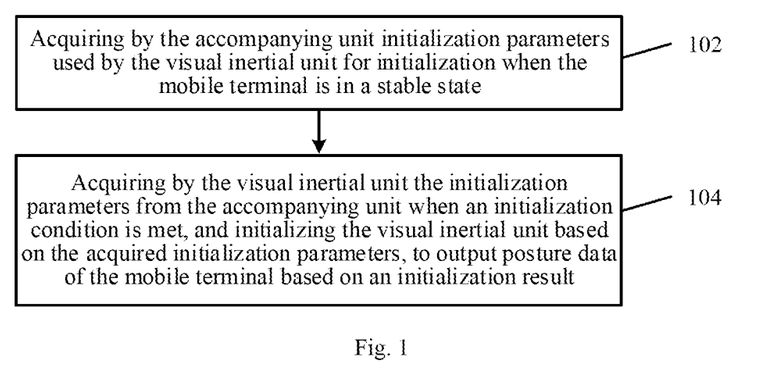
FIG. 1 is a flowchart of a posture recognition method according to an illustrative embodiment of the present disclosure.

FIG. 1 is a flowchart of a posture recognition method according to an illustrative embodiment of the present disclosure. The method is applied to a mobile terminal. A visual inertial unit and an accompanying unit different from the visual inertial unit are disposed in the mobile terminal. The accompanying unit is started earlier than the visual inertial unit. As shown in FIG. 1, the method may include the following steps.

At step 102, when the mobile terminal is in a stable state, the accompanying unit acquires initialization parameters used by the visual inertia unit for initialization.

In the present disclosure, the fact that the mobile terminal is in the stable state may indicate that the mobile terminal is not in a state where the moving speed is high or the moving direction changes frequently. For example, the stable state may indicate a state in which the moving speed/acceleration of the mobile terminal is less than a preset speed/acceleration, and/or, the stable state indicates a state in which the moving direction of the mobile terminal is less than a preset range within a preset time.

In the present disclosure, since the accompanying unit needs to provide the initialization parameters to the visual inertial unit so that the visual inertial unit can use them to initialize itself, the accompanying unit may be started earlier than the visual inertial unit, so as to ensure that the visual inertial unit can acquire the initialization parameters from the accompanying unit at any time.

In the present disclosure, the starting time of the accompanying unit needs to be earlier than that of the visual inertial unit to ensure that the accompanying unit can provide accurate initialization parameters at any time after the visual inertial unit is started, and there is no other rigid requirements, which can be determined by those skilled in the art according to actual needs. For example, the accompanying unit may be set to be started automatically when the mobile terminal is powered on. In this case, the requirement of "providing the initialization parameters to the visual inertial unit at any time" can be met to the greatest extent. For another example, the accompanying unit may be set to be started when the mobile terminal is in a particular state. For example, the particular state may be "when it is detected that the mobile terminal is in a static state". In this case, the initialization parameters acquired after starting can be guaranteed to be accurate. For another example, the particular state may be "when the mobile terminal receives a motion instruction but has not started to move". Of course, the above examples are only illustrative, and the present disclosure does not limit how to set the starting time of the accompanying unit.

In the present disclosure, it may be determined whether the mobile terminal is in the stable state based on the motion parameters of the mobile terminal. In a case, the present disclosure may determine that the mobile terminal is in the stable state when the acquired motion parameters indicate that the mobile terminal is in the static state. In another case, the present disclosure may determine that the mobile terminal is in the stable state when the acquired motion parameters indicate that the mobile terminal is in a low-speed motion state with a moving speed lower than a preset speed. In yet another case, the present disclosure may determine that the mobile terminal is in the stable state when the acquired motion parameters indicate that the mobile terminal is in a regular motion state. In the first two cases, the acquired motion parameter may be the speed parameter of the mobile terminal, and it can be determined that the mobile terminal is in the stable state as long as the speed parameter does not reach the preset speed. In the third case, the condition of regular motion may be set according to actual needs. For example, a motion state in which the speed is constant, but the speed direction changes periodically may be determined as the regular motion, and for another example, a motion state in which the speed direction is constant and the speed changes periodically may be determined as the regular motion. It should be understood that in the regular motion, the change of the parameter is also predictable, so that the above initialization parameters can be determined and acquired accurately. Of course, the above examples are only illustrative. How to determine whether the mobile terminal is in the stable state according to the motion parameters may be determined by those skilled in the art according to actual needs, and the present disclosure does not limit this.

Besides determining whether the mobile terminal is in the stable state based on the motion parameters of the mobile terminal, it is also possible to determine whether the mobile terminal is in the stable state based on other information. For example, since the mobile terminal performs corresponding operations based on various instructions and then starts to move, it will not move when it does not receive the motion instruction. Thus, it may also be judged whether the mobile terminal is in the stable state based on whether the mobile terminal receives the motion instruction. For example, if the mobile terminal does not receive the motion instruction, it may be determined that the mobile terminal is in the stable state such as the static state, and the initialization parameters may be acquired by the accompanying unit.

Of course, the above examples are only illustrative, and what information is specifically used to determine whether the mobile terminal is in the stable state and how to determine whether the mobile terminal is in the stable state based on various information are both illustrative and may be determined by those skilled in the art according to actual needs, which is not limited by the present disclosure.

It should be emphasized that the above operation of judging whether the mobile terminal is in the stable state may be executed by any component in the mobile terminal according to the actual situation. For example, this operation may be executed by a central processor of the mobile terminal or the above accompanying unit, which is not limited by the present disclosure.

In the present disclosure, the initialization parameters acquired by the accompanying unit may be related to the initialization requirements of the visual inertial unit. Since the most important thing during the initialization of the visual inertial unit is to determine the gravity direction and the zero bias of the mobile terminal, the initialization parameters acquired by the accompanying unit when the mobile terminal is in the stable state are the gravity direction and the zero bias of the mobile terminal.

It should be noted that zero bias refers to the parameter value used for initial correction of the posture or motion state of the mobile terminal. For example, when the mobile terminal is in the static state, the detected motion parameters such as the linear acceleration and the angular acceleration should be zero, but the actually detected acceleration value may not be zero, and the zero bias is the parameter value used for correcting the acceleration in the static state to zero. For example, the acquired zero bias may include the zero bias of the linear acceleration and the zero bias of the angular acceleration.

In the present disclosure, the accompanying unit may acquire sensor parameters in the mobile terminal to acquire the initialization parameters based on the acquired sensor parameters. For example, an Inertial Measurement Unit (IMU) may be installed in the mobile terminal, then the accompanying unit may acquire acceleration parameters from the IMU to determine the initialization parameters used by the visual inertial unit for initialization based on the acceleration parameters. For example, the above gravity direction and zero bias may be calculated to serve as the initialization parameters based on the acquired angular acceleration and linear acceleration. It is worth noting that the IMU may include a gyroscope and an accelerometer, and the sensor parameters are essentially acquired from the accelerometer and the gyroscope.

In addition to acquiring the sensor parameters from the IMU to determine the initialization parameters, other sensor parameters may also be acquired for determining the initialization parameters. For example, the accompanying unit may also acquire sensor parameters from sensors such as a speed sensor, a displacement sensor, a vision sensor or the like for determining the above initialization parameters. Of course, the above examples are only illustrative, and what sensor parameters are acquired for determining the initialization parameters may be determined by those skilled in the art according to actual needs, which is not limited by the present disclosure.

At step 104, the visual inertial unit acquires the initialization parameters from the accompanying unit when the initialization condition is met, and is initialized based on the acquired initialization parameters, so as to output posture data of the mobile terminal based on an initialization result.

In the present disclosure, an initialization condition may be set for the visual inertial unit, so that the initialization parameters may be acquired from the accompanying unit when the initialization condition is met, and the initialization may be performed based on the acquired initialization parameters. For example, the initialization condition may be that the visual inertial unit is started. For another example, the initialization condition may be that the posture data output by the visual inertial unit is inaccurate. Of course, these examples are only illustrative, and how to specifically set the initialization condition may be determined by those skilled in the art according to actual needs, which is not limited by the present disclosure.

When the initialization condition is that the visual inertial unit is started, it may include many situations. For example, it may be the case that the mobile terminal starts the visual inertial unit for the first time after being powered on. For another example, it may be the case that the mobile terminal restarts the visual inertial unit when the visual inertial unit fails to operate. It should be understood that any situation of restarting the visual inertial unit is regarded as that the initialization condition has been met, and the specific situation may be determined by those skilled in the art according to actual needs, which is not limited by the present disclosure.

When the initialization condition is that the posture data output by the visual inertial unit is inaccurate, it may be judged whether the output posture data is accurate in many ways.

For example, the mobile terminal may also include an odometer for determining a mileage value of the mobile terminal, and then the mobile terminal may acquire the mileage value output by the odometer, and compare the acquired mileage value with a mileage value calculated based on the posture data output by the visual inertial unit, so as to acquire a mileage difference between them. If the difference between them is large, for example the calculated mileage difference exceeds a preset difference, it is determined that the posture data output by the visual inertial unit is inaccurate.

In this example, the odometer disposed in the mobile terminal may be one of conventional odometers such as a wheel odometer and a foot odometer, and what odometer is used may be determined by those skilled in the art according to actual needs, which is not limited by the present disclosure.

Besides comparing the mileages to determine whether the posture data is accurate, it may also be determined in other ways. For example, when the mobile terminal moves according to a preset route, that is, when the output posture data is used for navigation, if the posture data is accurate, it will certainly be able to travel according to the preset route and will not collide with other objects. In this case, if the mobile terminal detects collision with other objects, it can be determined that the output posture data is inaccurate, and then the initialization needs to be carried out again.

Of course, the above examples are only illustrative, and how to determine whether the posture data output by the visual inertial unit is accurate may be determined by those skilled in the art according to actual needs, which is not limited by the present disclosure.

It is worth noting that the present disclosure may adopt only one above initialization condition, or adopt a plurality of above initialization conditions at the same time, so as to perform the initialization operation of the visual inertial unit when any initialization condition is met, which is not limited by the present disclosure.

In the present disclosure, if the initialization condition includes that the posture data output by the visual inertial unit is inaccurate and this initialization condition is met, the visual inertial unit cannot output posture data because the reinitialization process takes a certain time, and the posture change during the motion of the mobile terminal has certain continuity, so that the present disclosure may also restore the posture data in the reinitialization process based on the posture data before and after reinitialization. For example, the mobile terminal may acquire the historical posture data output by the visual inertial unit before determining that the posture data output by the visual inertial unit is inaccurate, and the current posture data after the reinitialization, and determine the posture data of the mobile terminal in the reinitialization process based on the acquired historical posture data and current posture data. For example, the posture data in the reinitialization process may be fitted and obtained by inputting the historical posture data and the current posture data into the Kalman filter equation. Of course, this example is only illustrative, and how to acquire the posture data of the mobile terminal in the reinitialization process may be determined by those skilled in the art according to actual needs, which is not limited by the present disclosure.

It should be noted that the mobile terminal in the present disclosure may be of any type, for example, it may be an emerging mobile terminal such as a robot, a smart car and an unmanned aerial vehicle, and it may also be a mobile terminal in the traditional sense such as a smart phone and a tablet computer. It should be understood that any mobile terminal equipped with the visual inertial unit may be the executive subject of the present disclosure, and the specific type of the mobile terminal to which the present disclosure is applied may be determined by those skilled in the art according to actual needs, which is not limited by the present disclosure.

According to the above technical solution, the accompanying unit which is different from the visual inertial unit and is dedicated to acquiring the initialization parameters used by the visual inertial unit for initialization may be disposed in the mobile terminal, and the accompanying unit is started earlier than the visual inertial unit. On this basis, the accompanying unit may acquire the above initialization parameters when the mobile terminal is in the stable state, so that the initialization parameters for initialization can be directly acquired from the accompanying unit when the visual inertial unit needs to be initialized. In this way, it can be ensured that the initialization parameters used by the visual inertial unit for initialization are accurate initialization parameters acquired when the mobile terminal is in the stable state, thus avoiding the problem in the related art that the initialization parameters may be inaccurate because the visual inertial unit acquires the initialization parameters by itself when it is started and the initialization parameters may be acquired when the mobile terminal is in the unstable state, and further the resulted problem that the posture data output by the visual inertial unit based on the initialization result is inaccurate.

Next, the technical solution of the present disclosure will be introduced by taking an example of initializing the visual inertial unit assembled in the robot. For the convenience of expression, "VIO" is used to represent the visual inertial unit, and "Bias" is used to represent the zero bias of the robot.

Figure 2:
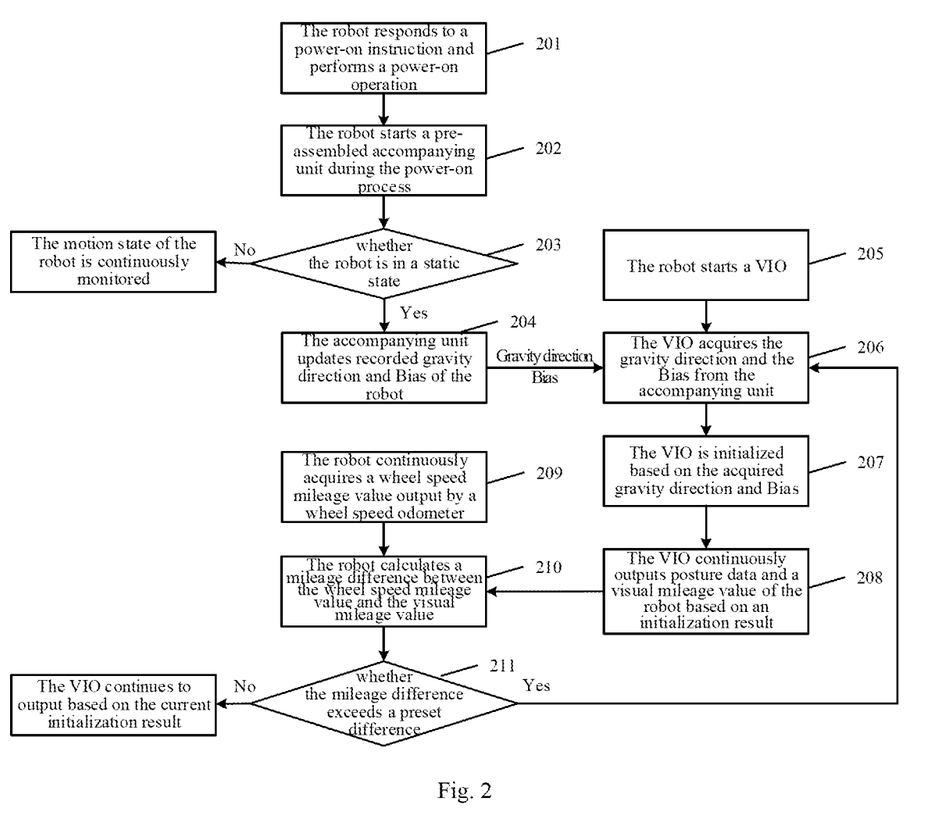
FIG. 2 is a flowchart of a robot posture correction method according to an illustrative embodiment of the present disclosure.

FIG. 2 is a flowchart of a robot posture correction method according to an illustrative embodiment of the present disclosure. As shown in FIG. 2, the method may include the following steps.

At step 201, the robot responds to a power-on instruction and performs a power-on operation. In this embodiment, the robot may be powered on by a manual remote control, or may perform the power-on operation when a power-on button is detected to be triggered. In addition, the robot may also be powered on according to a preset timing power-on strategy, which is not limited in this embodiment.

At step 202, the robot starts a pre-assembled accompanying unit during the power-on process. In this embodiment, the robot may start the pre-assembled accompanying unit when it is powered on. For example, the accompanying unit may be started at a BIOS stage of the robot to ensure that the initialization parameters can be updated according to the continuously monitored robot state during the motion of the robot.

At step 203, the accompanying unit monitors whether the robot is in a static state. If so, skip to step 204. Otherwise, the motion state of the robot is continuously monitored.

In this embodiment, that the robot is stationary may serve as the above stable state. On this basis, the accompanying unit may monitor the motion state of the robot to acquire the initialization parameters of the VIO when the robot is in the static state. For example, a preset speed may be provided, and when it is detected that the moving speed of the robot is lower than the preset speed, the robot is regarded as in the static state. At this time, the initialization parameters such as the gravity direction and the Bias may be acquired.

At step 204, the accompanying unit updates recorded gravity direction and Bias of the robot. In this embodiment, the robot may be equipped with an IMU, and the IMU may include an accelerometer and a gyroscope, so that the accompanying unit can acquire the accelerometer parameters and the gyroscope parameters to calculate and obtain the gravity direction and the Bias according to the accelerometer parameters and the gyroscope parameters.

It is worth noting that the operation of acquiring and updating the gravity direction and the Bias is performed every time the accompanying unit detects that the robot is in the static state, which is a continuous operation, not performed just once.

At step 205, the robot starts a VIO. In this embodiment, when the robot starts the VIO, the VIO must be initialized to perform posture recognition based on an initialization result. For example, the initialization operation of the VIO may be establishing a three-dimensional coordinate system based on the gravity direction and the Bias, so as to represent posture data based on coordinates and vectors in the three-dimensional coordinate system in a subsequent posture recognition process.

At step 206, the VIO acquires the gravity direction and the Bias from the accompanying unit. In this embodiment, when the VIO is initialized, it directly acquires the gravity direction and the Bias from the accompanying unit for initialization, without acquiring the initialization parameters by itself.

It is worth noting that the operation of acquiring the gravity direction and the Bias from the accompanying unit in this embodiment is performed when the initialization condition is met, and the initialization condition includes that the robot is powered on and that the mileage difference exceeds the preset difference, which will be introduced later.

At step 207, the VIO is initialized based on the acquired gravity direction and Bias.

At step 208, the VIO continuously outputs posture data and a visual mileage value of the robot based on an initialization result. In this embodiment, the VIO may also acquire the accelerometer parameters and the gyroscope parameters from the IMU, and image parameters from a visual sensor (such as a camera), for outputting the posture data and the visual mileage value of the robot.

It is worth noting that the output of the posture data by the VIO is a continuous operation, which predicts the posture at the next moment based on the posture at the previous moment and the acquired sensor parameters, instead of directly relying on the initialization result every time the posture data is output.

At step 209, the robot continuously acquires a wheel speed mileage value output by a wheel speed odometer. In this embodiment, the robot may also be equipped with the wheel speed odometer dedicated to acquiring the travel mileage of the robot, and the output of the wheel speed odometer may be called the wheel speed mileage value in this embodiment. Although the wheel speed mileage value output by the wheel speed odometer has a certain error, which is not usually used as an accurate mileage value, the wheel speed mileage value will not be too different from the actual travel mileage. Therefore, it may be judged whether the output of the VIO is accurate based on the wheel speed mileage value in this embodiment.

At step 210, the robot calculates a mileage difference between the wheel speed mileage value and the visual mileage value. In this embodiment, the robot may calculate the mileage difference between the wheel speed mileage value and the visual mileage value to judge whether the visual mileage value output by the VIO is accurate according to the mileage difference.

At step 211, the robot judges whether the mileage difference exceeds a preset difference. If so, skip to step 206. Otherwise, the VIO continues to output based on the current initialization result.

In this embodiment, after the mileage difference is calculated, the mileage difference may be compared with the preset difference. If the comparison result indicates that the mileage difference exceeds the preset difference, it proves that the posture data output by the VIO is inaccurate. Therefore, the VIO may acquire the gravity direction and Bias from the accompanying unit for reinitialization.

It is worth noting that the above operation of calculating the mileage difference and judging whether the mileage difference exceeds the preset difference may be performed by any component included in the robot, for example, by the VIO itself, by the accompanying unit or by the CPU, which is not limited in this embodiment.

As can be seen from the above technical solution, the present disclosure may deploy the accompanying unit different from the VIO in the mobile terminal such as the robot to be dedicated to acquiring the initialization parameters for the initialization of the VIO. The accompanying unit may be started automatically when the mobile terminal is powered on, which ensures that the accurate initialization parameters can be acquired when the mobile terminal is in the static state, so that the VIO may directly acquire the initialization parameters from the accompanying unit when it needs to be initialized, without temporarily acquiring the initialization parameters by itself, which ensures the accuracy of the initialization parameters and avoids the problem that the acquired initialization parameters are inaccurate because the VIO needs to temporarily acquire the initialization parameters by itself when it needs to be initialized and the mobile terminal is not in the stable state when the initialization parameters are acquired.

Figure 3:
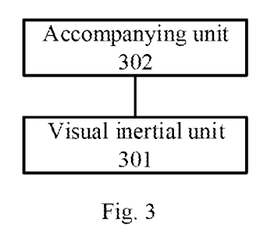
FIG. 3 is a block diagram of a posture recognition device according to an illustrative embodiment of the present disclosure.

FIG. 3 is a block diagram of a posture recognition device according to an illustrative embodiment of the present disclosure. The device is applied to a mobile terminal, and referring to FIG. 3, the device includes a visual inertial unit 301 and an accompanying unit 302 different from the visual inertial unit 301.

The accompanying unit 302 is started earlier than the visual inertial unit, and is configured to acquire initialization parameters used by the visual inertial unit for initialization when the mobile terminal is in a stable state.

The visual inertia unit 301 is configured to acquire the initialization parameters from the accompanying unit when an initialization condition is met, and to be initialized based on the acquired initialization parameters, so as to output posture data of the mobile terminal based on the initialization result.

In some embodiments, the accompanying unit 302 is started automatically when the mobile terminal is powered on. In some embodiments, the accompanying unit 302 is further configured to acquire a gravity direction and a zero bias of the mobile terminal as the initialization parameters used by the visual inertial unit for initialization.

In some embodiments, the accompanying unit 302 is further configured to: acquire acceleration parameters from an inertial sensor included in the mobile terminal to determine the initialization parameters used by the visual inertial unit for initialization based on the acquired acceleration parameters.

In some embodiments, the initialization condition includes at least one of the followings: the visual inertial unit is started; and the posture data output by the visual inertial unit is inaccurate.

Figure 4:
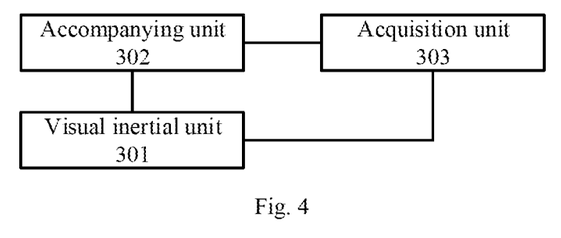
FIG. 4 is a block diagram of another posture recognition device according to an illustrative embodiment of the present disclosure.

FIG. 4 is a block diagram of another posture recognition device shown in an illustrative embodiment of the present disclosure. As shown in FIG. 4, the device further includes an acquisition unit 303 on the basis of the aforementioned embodiment shown in FIG. 3.

In some embodiments, the acquisition unit 303 is configured to acquire motion parameters of the mobile terminal.

When the acquired motion parameters represent that the mobile terminal is in at least one of the following states, i.e. a static state, a low-speed motion state with a moving speed lower than a preset speed, and a regular motion state, it is determined that the mobile terminal is in the stable state.

In some embodiments, the acquisition unit 303 is further configured to: acquire a mileage value output by an odometer included in the mobile terminal, and calculate a mileage difference between the acquired mileage value and a mileage value calculated based on the posture data output by the visual inertia unit.

When the mileage difference is greater than a preset difference, it is determined that the posture data output by the visual inertial unit is inaccurate.

In some embodiments, after reinitialization when the posture data output by the visual inertia unit is inaccurate, the acquisition unit 303 is further configured to: acquire historical posture data output by the visual inertial unit before determining that the posture data output by the visual inertial unit is inaccurate, and current posture data after reinitialization; and determine posture data of the mobile terminal in a reinitialization process based on the historical posture data and the current posture data.

For the embodiments of the device, since they substantially correspond to the method embodiments, it is only necessary to refer to partial descriptions of the method embodiments for the relevant points. The embodiments of the device described above are only illustrative, in which the units described as separate components may or may not be physically separated, and the components displayed as units may or may not be physical units, that is, they may be located in one place or distributed to multiple network units. Some or all of the modules may be selected according to actual needs to achieve the purpose of the technical solution of the present disclosure, which may be understood and implemented by those ordinary skilled in the art without inventive efforts.

Correspondingly, the present disclosure also provides a posture recognition device, which includes a processor and a memory for storing instructions executable by the processor. The processor is configured to realize the posture recognition method as described in any one of the above embodiments. For example, the method may include: instructing an accompanying unit to acquire initialization parameters used by a visual inertia unit for initialization when a mobile terminal is in a stable state; and instructing the visual inertial unit to acquire the initialization parameters from the accompanying unit when a initialization condition is met, and to be initialized based on the acquired initialization parameters, so as to output posture data of the mobile terminal based on an initialization result.

Correspondingly, the present disclosure also provides an electronic device, which includes a memory and one or more programs. The one or more programs are stored in the memory and are configured to be executed by one or more processors, and the one or more programs contain instructions for realizing the posture recognition method as described in any one of the above embodiments. That is, the one or more processors are configured to execute the instructions contained in the one or more programs to realize the posture recognition method as described in any one of the above embodiments. For example, the method may include: instructing an accompanying unit to acquire initialization parameters used by a visual inertia unit for initialization when a mobile terminal is in a stable state; and instructing the visual inertial unit to acquire the initialization parameters from the accompanying unit when a initialization condition is met, and to be initialized based on the acquired initialization parameters, so as to output posture data of the mobile terminal based on an initialization result.

Figure 5:
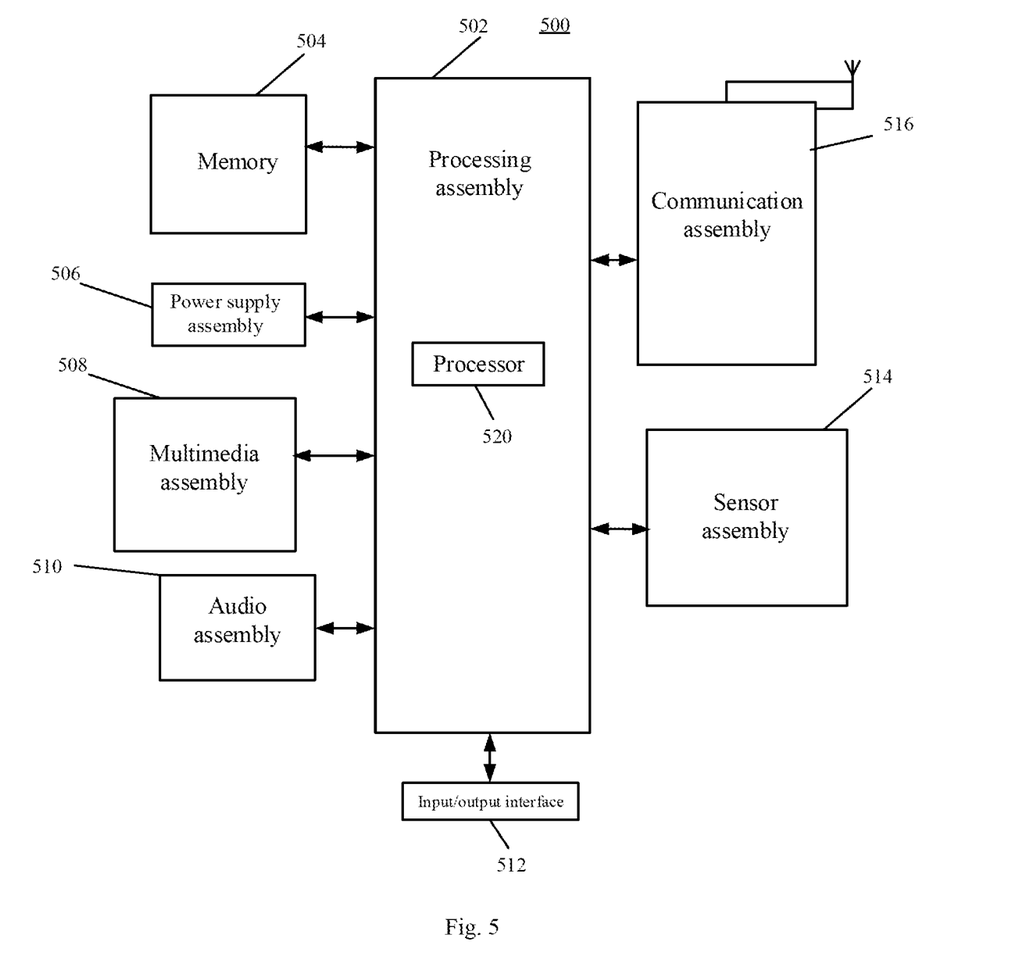
FIG. 5 is a schematic diagram of an electronic device according to an illustrative embodiment of the present disclosure.

FIG. 5 is a block diagram of a device 500 for implementing a posture recognition method according to an illustrative embodiment. For example, the device 500 may be a mobile phone, a computer, a digital broadcasting terminal, a messaging device, a game console, a tablet device, a medical device, a fitness device, a personal digital assistant and the like.

Referring to FIG. 5, the device 500 may include one or more of the following assemblies: a processing assembly 502, a memory 504, a power assembly 506, a multimedia assembly 508, an audio assembly 510, an input/output (I/O) interface 512, a sensor assembly 514, and a communication assembly 516.

The processing assembly 502 generally controls the overall operation of the device 500, such as operations associated with display, telephone call, data communication, camera operation and recording operation. The processing assembly 502 may include one or more processors 520 to execute instructions to complete all or part of the steps of the method described above. In addition, the processing assembly 502 can include one or more modules to facilitate the interaction between the processing assembly 502 and other assemblies. For example, the processing assembly 502 can include a multimedia module to facilitate interaction between the multimedia assembly 508 and the processing assembly 502.

The memory 504 is configured to store various types of data to support operations in the device 500. Examples of these data include instructions for any application or method operating on the device 500, contact data, phone book data, messages, pictures, videos, and the like. The memory 504 may be realized by any type of volatile or nonvolatile memory device or their combination, such as static random access memory (SRAM), electrically erasable programmable read-only memory (EEPROM), erasable programmable read-only memory (EPROM), programmable read-only memory (PROM), read-only memory (ROM), magnetic memory, flash memory, magnetic disk or optical disk.

The power supply assembly 506 provides power to various assemblies of the device 500. The power supply assembly 506 may include a power management system, one or more power supplies, and other assemblies associated with generating, managing and distributing power for the device 500).

The multimedia assembly 508 includes a screen that provides an output interface between the device 500 and the user. In some embodiments, the screen may include a liquid crystal display (LCD) and a touch panel (TP). If the screen includes a touch panel, the screen may be implemented as a touch screen to receive an input signal from a user. The touch panel includes one or more touch sensors to sense touch, sliding and postures on the touch panel. The touch sensor may not only sense the boundary of a touch or sliding action, but also detect the duration and pressure related to the touch or sliding operation. In some embodiments, the multimedia assembly 508 includes a front camera and/or a rear camera. When the device 500 is in an operation mode, such as a shooting mode or a video mode, the front camera and/or the rear camera may receive external multimedia data. Each front camera and each rear camera may be a fixed optical lens system or have a focal length and an optical zoom capability.

The audio assembly 510 is configured to output and/or input audio signals. For example, the audio assembly 510 includes a microphone (MIC) configured to receive external audio signals when the device 500 is in an operation mode, such as a call mode, a recording mode and a voice recognition mode. The received audio signal may be further stored in the memory 504 or transmitted via the communication assembly 516. In some embodiments, the audio assembly 510 further includes a speaker for outputting audio signals.

I/O interface 512 provides an interface between the processing assembly 502 and peripheral interface modules, which may be keyboards, clickwheels, buttons, etc. These buttons may include, but are not limited to, a home button, a volume button, a start button and a lock button.

The sensor assembly 514 includes one or more sensors for providing various aspects of the state evaluation for the device 500). For example, the sensor assembly 514 may detect the on/off state of the device 500, the relative positioning of assemblies, such as the display and keypad of the device 500, the position change of the device 500 or an assembly of the device 500, the presence or absence of the user's contact with the device 500, the orientation or acceleration/deceleration of the device 500 and the temperature change of the device 500. The sensor assembly 514 may include a proximity sensor configured to detect the presence of a nearby object without any physical contact. The sensor assembly 514 may also include an optical sensor, such as a CMOS or CCD image sensor, for use in imaging applications. In some embodiments, the sensor assembly 514 may further include an acceleration sensor, a gyroscope sensor, a magnetic sensor, a pressure sensor or a temperature sensor.

The communication assembly 516 is configured to facilitate wired or wireless communication between the device 500 and other devices. The device 500 may access a wireless network based on any communication standard, such as WiFi, 2G or 3G, 4G LTE, 5G NR (New Radio) or their combination. In an illustrative embodiment, the communication assembly 516 receives a broadcast signal or broadcast related information from an external broadcast management system via a broadcast channel. In an illustrative embodiment, the communication assembly 516 further includes a near field communication (NFC) module to facilitate short-range communication. For example, the NFC module may be implemented based on radio frequency identification (RFID) technology, infrared data association (IrDA) technology, ultra-wideband (UWB) technology, Bluetooth (BT) technology and other technologies.

In an illustrative embodiment, the device 500 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors or other electronic assemblies for performing the above methods.

In an illustrative embodiment, there is also provided a non-transitory computer-readable storage medium including instructions, such as the memory 504 including instructions, and the instructions may be executed by the processor 520 of the device 500 to complete the above method. For example, the non-transitory computer-readable storage medium may be ROM, random access memory (RAM), CD-ROM, magnetic tape, floppy disk, optical data storage device, etc.

Other embodiments of the present disclosure will easily occur to those skilled in the art after they consider the specification and practice the present disclosure disclosed herein. The present disclosure is intended to cover any variations, uses or adaptations of the present disclosure, which follow the general principles of the present disclosure and include common sense or common technical means in the art that are not disclosed in the present disclosure. The specification and examples are to be regarded as illustrative only, while the true scope and spirit of the present disclosure are indicated by the following claims.

It should be understood that the present disclosure is not limited to the precise structure described above and shown in the drawings, and various modifications and changes can be made without departing from its scope. The scope of the present disclosure is limited only by the appended claims.

The above description is only the preferred embodiment of the present disclosure, and it is not used to limit the present disclosure. Any modification, equivalent substitution, improvement and the like made within the spirit and principle of the present disclosure should be included in the scope of protection of the present disclosure.

The invention claimed is:

1. A posture recognition method, applied to a mobile terminal, wherein the mobile terminal comprises a visual inertial unit and an accompanying unit different from the visual inertial unit, the accompanying unit is started earlier than the visual inertial unit, and the method comprises:
 acquiring by the accompanying unit initialization parameters used by the visual inertial unit for initialization in response to determining that the mobile terminal is in a stable state; and
 acquiring by the visual inertial unit the initialization parameters from the accompanying unit in response to determining that an initialization condition is met, and initializing the visual inertial unit based on the acquired initialization parameters, to output posture data of the mobile terminal based on an initialization result,
 wherein the initialization condition comprises at least one of following conditions:
 the visual inertial unit is started; and
 the posture data output by the visual inertial unit is inaccurate,
 wherein the method further comprises:
 acquiring a mileage value output by an odometer comprises in the mobile terminal, and calculating a mileage difference between the acquired mileage value and a mileage value calculated based on the posture data output by the visual inertia unit;
 wherein in response to determining that the mileage difference is greater than a preset difference, it is determined that the posture data output by the visual inertial unit is inaccurate.

2. The method according to claim 1, wherein the accompanying unit is started automatically in response to determining that the mobile terminal is powered on.

3. The method according to claim 1, further comprising:
 acquiring motion parameters of the mobile terminal;
 wherein it is determined that the mobile terminal is in the stable state in response to determining that the acquired motion parameters represent that the mobile terminal is in at least one of following states:
 a static state, a low-speed motion state with a moving speed lower than a preset speed or a regular motion state.

4. The method according to claim 1, wherein acquiring the initialization parameters used by the visual inertial unit for initialization comprises:
 acquiring a gravity direction and a zero bias of the mobile terminal as the initialization parameters used by the visual inertial unit for initialization.

5. The method according to claim 1, wherein acquiring the initialization parameters used by the visual inertial unit for initialization comprises:
 acquiring acceleration parameters from an inertial sensor comprised in the mobile terminal to determine the initialization parameters used by the visual inertial unit for initialization based on the acquired acceleration parameters.

6. The method according to claim 1, after reinitialization in response to determining that the posture data output by the visual inertial unit is inaccurate, further comprising:
 acquiring historical posture data output by the visual inertial unit before determining that the posture data output by the visual inertial unit is inaccurate, and current posture data after reinitialization; and
 determining posture data of the mobile terminal in a reinitialization process based on the historical posture data and the current posture data.

7. An electronic device, comprising:
 a processor; and a memory for storing instructions executable by the processor;

wherein the processor is configured to:

instruct an accompanying unit to acquire initialization parameters used by a visual inertia unit for initialization in response to determining that a mobile terminal is in a stable state; and instruct the visual inertial unit to acquire the initialization parameters from the accompanying unit in response to determining that a initialization condition is met, and to be initialized based on the acquired initialization parameters, to output posture data of the mobile terminal based on an initialization result, wherein the initialization condition comprises at least one of following conditions:

the visual inertial unit is started; and the posture data output by the visual inertial unit is inaccurate, wherein the processor is further configured to:

acquire a mileage value output by an odometer comprises in the mobile terminal, and calculating a mileage difference between the acquired mileage value and a mileage value calculated based on the posture data output by the visual inertia unit;

wherein in response to determining that the mileage difference is greater than a preset difference, it is determined that the posture data output by the visual inertial unit is inaccurate.

8. The electronic device according to claim 7, wherein the accompanying unit is started automatically in response to determining that the mobile terminal is powered on.

9. The electronic device according to claim 7, wherein the processor is further configured to:

acquire motion parameters of the mobile terminal;

wherein it is determined that the mobile terminal is in the stable state in response to determining that the acquired motion parameters represent that the mobile terminal is in at least one of following states:

a static state, a low-speed motion state with a moving speed lower than a preset speed or a regular motion state.

10. The electronic device according to claim 7, wherein the processor is further configured to:

instruct the accompanying unit to acquire a gravity direction and a zero bias of the mobile terminal as the initialization parameters used by the visual inertial unit for initialization.

11. The electronic device according to claim 7, wherein the processor is further configured to:

instruct the accompanying unit to acquire acceleration parameters from an inertial sensor comprised in the mobile terminal to determine the initialization parameters used by the visual inertial unit for initialization based on the acquired acceleration parameters.

12. The electronic device according to claim 7, wherein after reinitialization in response to determining that the posture data output by the visual inertial unit is inaccurate, the processor is further configured to:

acquire historical posture data output by the visual inertial unit before determining that the posture data output by the visual inertial unit is inaccurate, and current posture data after reinitialization; and determine posture data of the mobile terminal in a reinitialization process based on the historical posture data and the current posture data.

\* \* \* \* \*